United States Patent [19]

Miyake et al.

[11] Patent Number: 5,630,193
[45] Date of Patent: May 13, 1997

[54] POWER SUPPLY SYSTEM FOR ELECTRONIC INSTRUMENT

[75] Inventors: Michihiro Miyake; Wataru Nakamura, both of Saitama, Japan

[73] Assignee: Fuji Photo Film Co., Ltd., Kanagawa, Japan

[21] Appl. No.: 571,185

[22] Filed: Dec. 12, 1995

[30] Foreign Application Priority Data

Dec. 16, 1994 [JP] Japan .................................. 6-312903

[51] Int. Cl.⁶ ............................ G03B 17/02; H01M 2/10
[52] U.S. Cl. ............................................. 396/539; 396/301
[58] Field of Search ...................... 348/375; 429/96–100; 307/150; 354/484, 288; 316/539, 301

[56] References Cited

U.S. PATENT DOCUMENTS

| | | | |
|---|---|---|---|
| 5,281,990 | 1/1994 | Huang | 354/484 |
| 5,394,073 | 2/1995 | Nagai | 320/2 |
| 5,415,947 | 5/1995 | Mitsui et al. | 429/99 |
| 5,455,737 | 10/1995 | Ogami et al. | 429/100 |
| 5,457,376 | 10/1995 | Chong et al. | 320/2 |

FOREIGN PATENT DOCUMENTS

| | | | |
|---|---|---|---|
| 4-526 | 1/1992 | Japan | H01M 2/10 |
| 4-284349 | 10/1992 | Japan | H01M 2/10 |
| 5-12820 | 2/1993 | Japan | H01M 2/10 |
| 5-12819 | 2/1993 | Japan | H01M 2/10 |

*Primary Examiner*—Safet Metjahic
*Assistant Examiner*—Michael Dalakis
*Attorney, Agent, or Firm*—Sughrue, Mion, Zinn, Macpeak & Seas

[57] ABSTRACT

A video camera (14) is loaded with a battery pack (11, 90) charged by an AC charger (15). The battery pack has a first pair of terminals (25, 26) for supplying electric power externally, and an outer wall (16). The AC charger has a second pair of terminals (53, 54), which are connectable to the first pair of terminals, and supply electric power externally. A receiving wall (21) is fitted on the outer wall. A detecting claw (66) is disposed to project from an inside to an outside of the receiving wall. The detecting claw is pressed by the outer wall and moved from the projected state to the retracted state. A terminal cover (60) is disposed on the receiving wall in a position covering the second pair of terminals and in movable fashion between the covering position and an uncovering position of uncovering the second pair of terminals. The terminal cover is pressed by the battery pack and moved from the covering position to an uncovering position. The second pair of terminals are connected to the first pair of terminals, and allow loading of the battery pack. A lock claw (65) is associated with the detecting claw and the terminal cover, stops the terminal cover in the covering position while the detecting claw is in the projected state, and allows the terminal cover to move to the uncovering position when the detecting claw is in the retracted state.

21 Claims, 11 Drawing Sheets

F I G.6
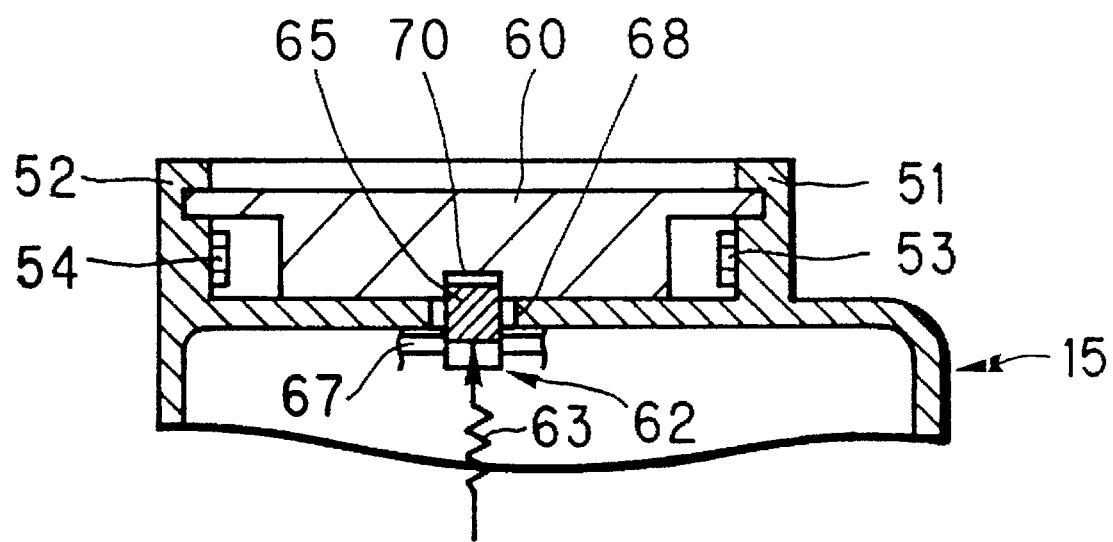

POWER SUPPLY SYSTEM FOR ELECTRONIC INSTRUMENT

BACKGROUND OF THE INVENTION

1. Field of the Invention

The present invention relates to a power supply system for an electronic instrument. More particularly, the present invention relates to a power supply system for an electronic instrument, capable of avoiding loading of the electronic instrument with a wrong one of plural power source units.

2. Description Related to the Prior Art

A portable type of a television camera with a video tape recorder (hereinafter referred to as video camera) is loaded with a battery pack, a power source adapter, or another power source unit, and is supplied with power by the power source unit. Examples of the battery pack include a type incorporating a storage battery (secondary cell) having been charged by a charger, and a type containing a dry battery (primary cell).

If the battery pack containing a dry battery is loaded on a charger and the charger is operated for charging, there is possibility that gas is generated by the liquid in the dry battery, to raise an inner pressure of the battery to the point of explosion. If the dry battery is a lithium type, spontaneous combustion may occur. If the power source adapter is loaded on to the charger and the charger is operated for charging, the inner circuit of the charger may be damaged.

To avoid the incorrect loading, JP-B 5-12819 and JP-B 5-12820 disclose a construction in which mated fittable faces are provided with a recess and a projection of plural kinds for connection. In a suitable combination, a recess and a projection are fitted on one another, to allow the loading. In an unsuitable combination, a recess and a projection are not engageable, so that improper loading is avoided.

JP-A 4-284349 discloses a video camera in which a cover member is movable between a position for covering power source terminals and a position for uncovering the terminals. While no battery pack is loaded on the video camera, the power source terminals are covered by the cover member, and are protected from deformation, corrosion or other damage. When a battery pack is mounted, an opener member of the battery pack moves the cover member toward the uncovering position in the direction for the loading. This movement of the cover member causes the terminals to emerge. Connecting terminals of the battery pack are connected to the power source terminals, and supplied with power.

However JP-B 5-12819 and JP-B 5-12820 only disclose prevention of improper loading, and not prevention of power source terminals of an electronic instrument from deformation, corrosion or other damages. In JP-A 4-284349, the cover member is only movable. If inadvertently pushed, the cover member is moved to the uncovering position. It is impossible for this cover member reliably to avoid deformation, corrosion or other damage of the terminals, as the cover member is easily moved manually. JP-A 4-284349 does not suggest prevention of improper loading. It would be conceivable to combine those known techniques for the purposes of avoidance of deformation, corrosion or other damage of terminals, and prevention of improper loading. However it would be inevitable that an electronic instrument would have a large space for a relevant mechanism. The electronic instrument could not have the relevant mechanism without being still more voluminous.

In a battery pack of JP-Y 4-526, there is a cover member that is movable between a position for covering power source terminals and a position for uncovering the terminals. In this battery pack, a considerable space is required for containing the cover member. If the volume of the battery pack is kept unchanged, a space for a storage battery must be reduced. When a size of the storage battery is reduced, it is inevitable that the storage battery has small capacity. On the other hand, if the capacity of a storage battery is desired to be greater, the volume of the battery pack should be raised. Accordingly the battery pack disclosed therein cannot be designed compactly. Although a nickel-hydrogen storage battery, with capacity 1.8 times as great as a Ni—Cd battery, could be used in such a battery pack, the battery pack with the movable cover member cannot have greater capacity and a more compact size at the same time.

SUMMARY OF THE INVENTION

In view of the foregoing problems, an object of the present invention is to provide a power supply system for an electronic instrument, capable of avoiding the wrong loading of a power source unit on an electronic instrument, and at the same time, capable of protecting power source terminals from deformation, corrosion or other damage, and capable of reducing the size of a power source unit to be designed.

In order to achieve the above and other objects and advantages of this invention, a power supply system comprises an electronic instrument and a first power source unit electrically connected thereto, for supplying the electronic instrument with electric power, or for being supplied by the electronic instrument with electric power. The first power source unit comprises a first terminal group, and a first outer wall being at least partially flat. The electronic instrument comprises a second terminal group, connectable to the first terminal group. A receiving wall is fitted on the first outer wall in attachment to the first power source unit. A projected portion is disposed in movable fashion between a projected state to project from an inside to an outside of the receiving wall, and a retracted state to retract to the inside of the receiving wall. The projected portion is pressed by the first outer wall and moved from the projected state to the retracted state, the projected portion being unmoved during attachment to a unit not having the first outer wall. A terminal cover is disposed on the receiving wall and in movable fashion between a covering position of covering the second terminal group, and an uncovering position of uncovering the second terminal group. The terminal cover is pressed by the first power source unit and moved from the covering position to the uncovering position, the second terminal group being connected to the first terminal group, to allow loading of the first power source unit. A lock device is associated with the projected portion and the terminal cover, for hindering the terminal cover from moving away from the covering position while the projected portion has the projected state. The lock device allows the terminal cover to move to the uncovering position when the projected portion has the retracted state.

The first power source unit is selected from a power source group.. The power source group further includes an alternative power source unit. The alternative power source unit includes a third terminal group, formed similarly to the second terminal group, for supplying electric power externally, and a second outer wall, formed similarly to the first outer wall. A detectable recess is formed in the second outer wall, and has a size to contain the projected portion having the projected state, for receiving the projected portion when the second outer wall is fitted on the receiving wall, to leave the terminal cover in the covering position.

The third terminal group is hindered from being connected to the first terminal group, avoiding loading on to the electronic instrument.

The first power source unit is a storage battery device. The electronic instrument is a storage battery charger adapted to charging the storage battery device.

In a preferred embodiment, the first power source unit is a storage battery device. The electronic instrument is a video camera supplied with the electric power by the storage battery device.

In the present invention, wrong loading of a power source unit on to an electronic instrument can be avoided. At the same time, power source terminals can be protected from deformation, corrosion or other damages. The power source unit to be designed can be reduced in size.

BRIEF DESCRIPTION OF THE DRAWINGS

The above objects and advantages of the present invention will become more apparent from the following detailed description when read in connection with the accompanying drawings, in which:

FIG. 6 is a cross section illustrating the receiving wall of the charger;

FIGS. 10A and 10C illustrate unsuitable combinations, FIG. 10B illustrates a suitable combination.

DETAILED DESCRIPTION OF THE PREFERRED EMBODIMENT(S) OF THE PRESENT INVENTION

There are auxiliary devices for use with a video camera: a battery pack, a power source adapter, an AC charger, a DC charger and the like. In the present embodiment, the term "power source unit" is used to include a battery pack and a power source adapter. The term "electronic instrument" is used to include a video camera, an AC charger and a DC charger. The power source adapter and the charger are so constructed that the former is inhibited from being loaded on to the latter, as described hereinafter in detail.

Figure 1A:
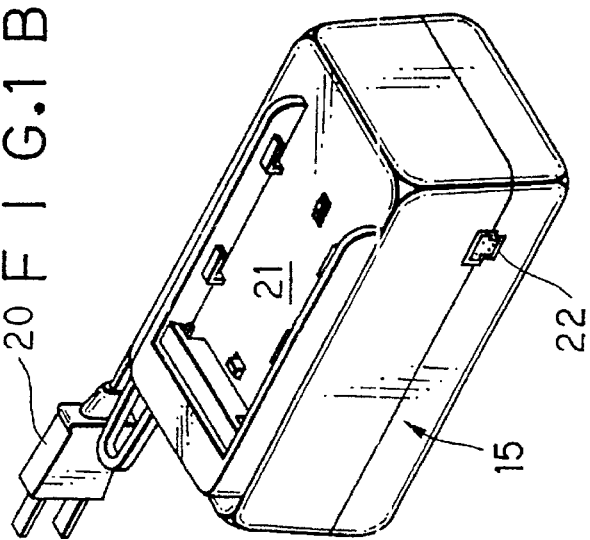
FIG. 1A is a perspective view illustrating a video camera and a battery pack.
Figure 1B:
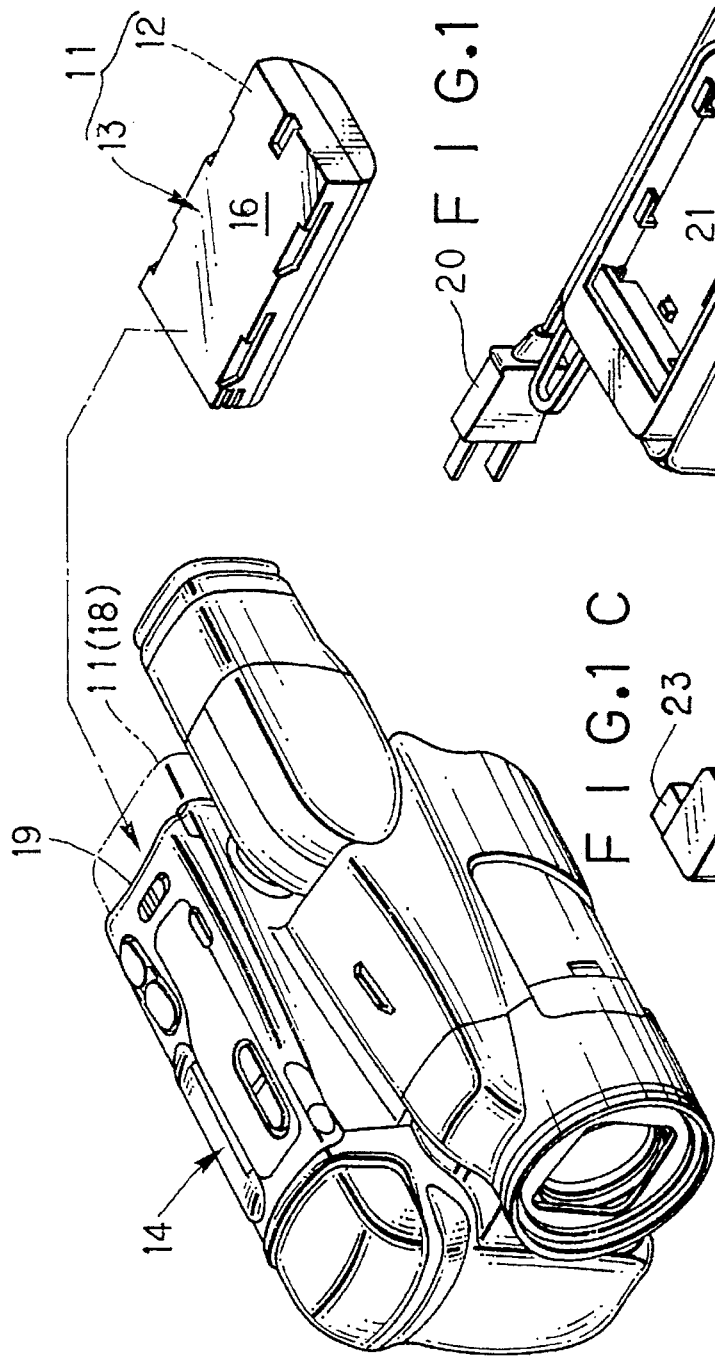
FIG. 1B is a perspective view illustrating a charger.
Figure 1C:
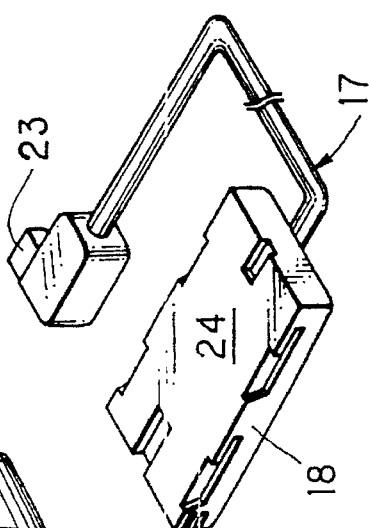
FIG. 1C is a perspective view illustrating a power source adapter.

FIGS. 1A–1C illustrate a battery pack 11 as a storage battery device, including a storage battery 12 and a battery case 13 for containing the storage battery 12. The storage battery 12 is for example a lithium ion battery as secondary cell. Outside the battery case 13, there is formed an outer wall 16 fittable on a video camera 14, an AC charger 15 and a DC charger.

The rear of the video camera 14 has a receiving wall 19 to be fitted on the outer wall of the battery pack 11 or a coupler 18 of a power source adapter 17.

The AC charger 15 incorporates a primary circuit including a power source transformer and a secondary circuit including a rectifier. A plug 20 is connected to the primary circuit, and is externally supplied with DC power by commercial power source. The AC charger 15 has a receiving wall 21 on which the battery pack 11 is mounted. The AC charger 15 supplied with the power charges the battery pack 11 as mounted. Outside the AC charger 15 is a connector receiver 22, which is connected to the secondary circuit of the AC charger 15. It is to be noted that a DC charger also has a plug to be connected to a socket disposed in an automobile and adapted to lighting cigarettes, instead of the power source plug 20. The socket supplies DC power (12 V/24 V) from a car battery with the DC charger, in which the power is transformed in a DC transformer in the DC charger so as to charge the battery pack 11. The DC charger in combination with the power source adapter 17 causes the car battery to supply the video camera 14 with the power directly. The DC charger also has a receiving wall and a connector receiver similar to those of the AC charger 15. Further description thereof is omitted.

The power source adapter 17 is connected between the AC charger 15 and the video camera 14, or between a DC charger and the video camera 14. The power source adapter 17 has a connector 23 for connection to the connector receiver 22, and the coupler 18 for connection to the video camera 14. The coupler 18 has an outer wall 24 adapted to loading on the receiving wall 19 of the video camera 14.

Figure 2:
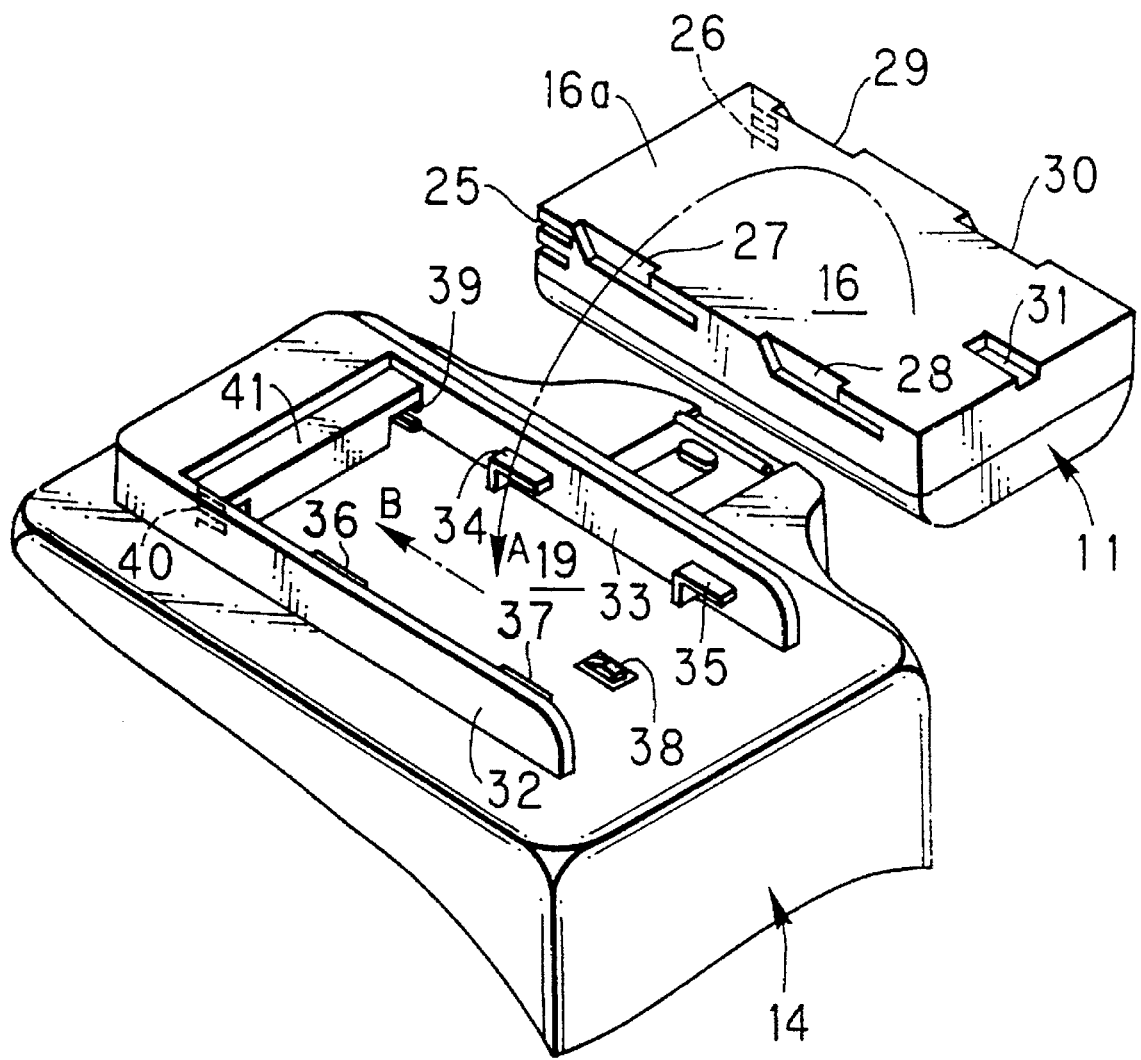
FIG. 2 is a perspective view illustrating an outer wall of the battery pack and a receiving wall of the video camera.

The battery case 13 of the battery pack 11, as illustrated in FIG. 2, has two pairs of grooves arranged in a fork shape, in lateral positions beside an advancing face of the battery pack 11. Terminals 25 and 26 are disposed in the grooves. The grooves are open in the direction of advancing the battery pack 11. Terminals of the video camera 14 or the outer wall 16 are inserted into the grooves through their open ends.

In the outer wall 16 are formed four grooves 27–30 and a cutout 31. The grooves 27–30 are located along longitudinal edges of the outer wall 16. The cutout 31 is located in the center of the outer wall 16. In lateral faces of the battery pack 11, the grooves 27–30 have an L-shape. The outer wall 16 has a pressing portion 16a in the center, to operate to allow the loading of the battery pack 11. The pressing portion 16a constitutes part of the flat face of the outer wall 16.

The receiving wall 19 of the video camera 14 has a pair of regulating rails 32 and 33, between which a space is defined and is substantially as wide as the battery pack 11. In the longitudinal direction, the regulating rails 32 and 33 are greater than the battery pack 11, and render the battery pack 11 slidable, while supporting it in the width direction. There are formed four ridges 34–37 on inner faces of the regulating rails 32 and 33 confronted with each other. The ridges 34–37 have a shape of a reversed L. When the battery pack 11 is mounted in the proper orientation, the ridges 34–37 are inserted respectively into the grooves 27–30, and then allow the grooves 27–30 to slide within a limited range in the direction B indicated by the arrow. If the battery pack 11 is placed in the improper, reversed orientation, the ridges 34–37 cannot be engaged respectively with the grooves 27–30.

For the loading of the battery pack 11, the outer wall 16 is at first contacted on the receiving wall 19 in the direction A between the regulating rails 32 and 33, as indicated in FIG. 2, in a position away from terminals. The battery pack 11 is then slid in the direction B, to be placed in the loading position. When the battery pack 11 is unloaded, the battery pack 11 is slid in reverse at first, and then moved away from the 19. There is formed an auxiliary hook 38 formed with the receiving wall 19 with resiliency and defined inside a crank-shaped slit. In mounting of the battery pack 11, the auxiliary hook 38 is engaged with the cutout 31, and prevents the battery pack 11 from moving in reverse to the direction B.

The regulating rails 32 and 33 have respective terminals 39 and 40, which are connected to the terminals 25 and 26 of the battery pack 11 when loaded. Between the terminals 39 and 40 is disposed a terminal cover 41, which has a T-shape as viewed in a section, and slidable between covering and uncovering positions. In the covering position, the terminal cover 41 covers the terminals 39 and 40 under its ends with smaller thickness. In the uncovering position, the terminal cover 41 is shifted away from the terminals 39 and 40 to let them emerge. A spring, plate spring or another bias device is associated with the terminal cover 41 to bias it to the covering position constantly. The terminal cover 41 is slidable in the direction B, as sliding direction of the battery pack 11. When none of the battery pack 11 or the power source adapter 17 is loaded, the terminal cover 41 of the video camera 14 keeps the terminals 39 and 40 covered. It is possible to protect the terminals 39 and 40 from deformation, corrosion or other damages.

Figure 3:
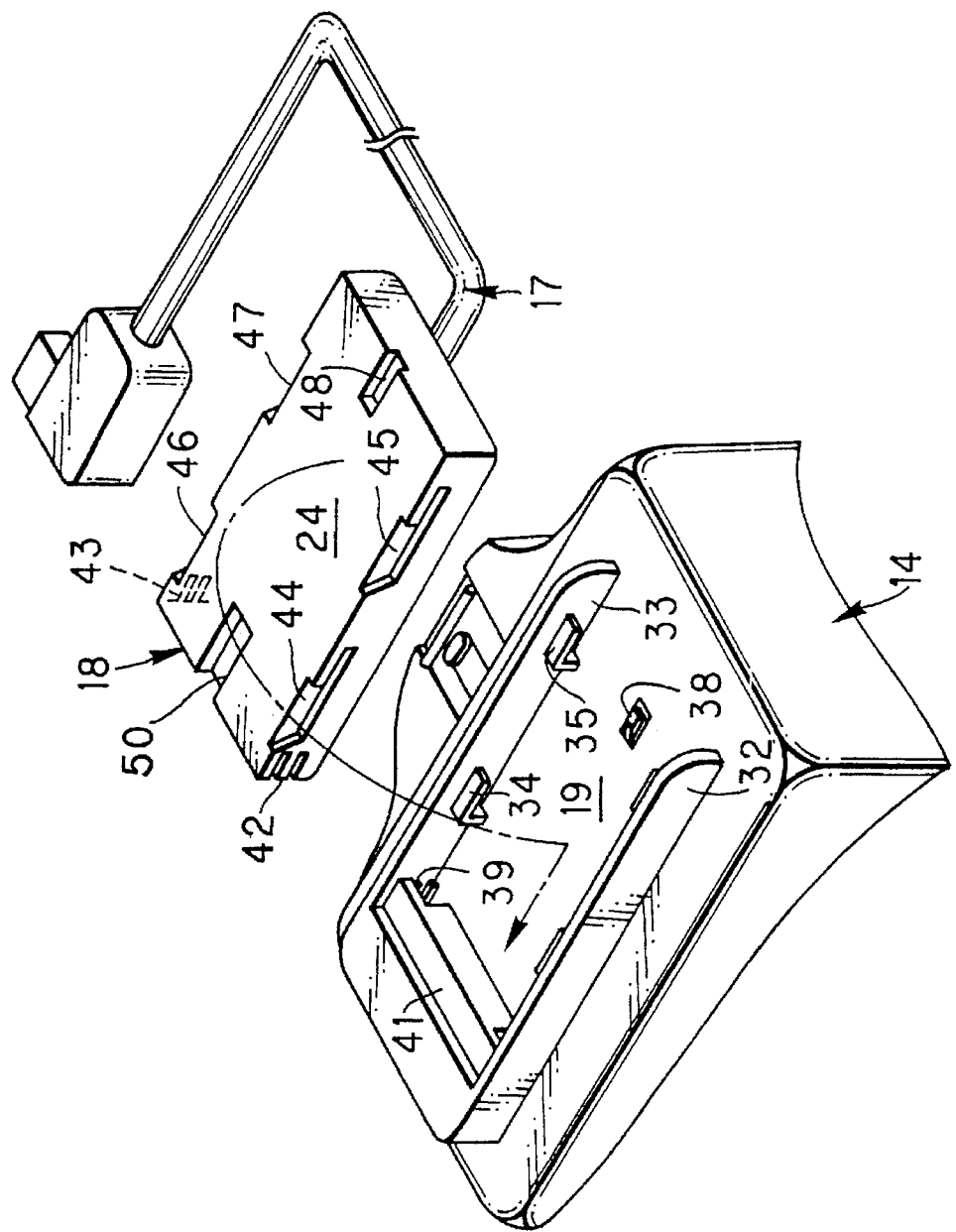
FIG. 3 is a perspective view illustrating an outer wall of the power source adapter and a receiving wall of the video camera.

The outer wall 24 of the coupler 18, as illustrated in FIG. 3, has a size equal to the outer wall 16 of the battery pack 11. For the loading on to the receiving wall 19 of the video camera 14, the outer wall 24 includes a pair of terminals 42 and 43, grooves 44–47 and a cutout 48, all of which are similar to counterparts of the outer wall 16.

Should the AC charger 15 be loaded with the coupler 18 and operated for charging, there is the possibility of damaging circuitry of the AC charger 15. To avoid loading the AC charger 15 with the coupler 18, the outer wall 24 has a detectable recess 50, which is formed in the center of the battery pack 11 in the location the same as the pressing portion 16a.

Figure 4:
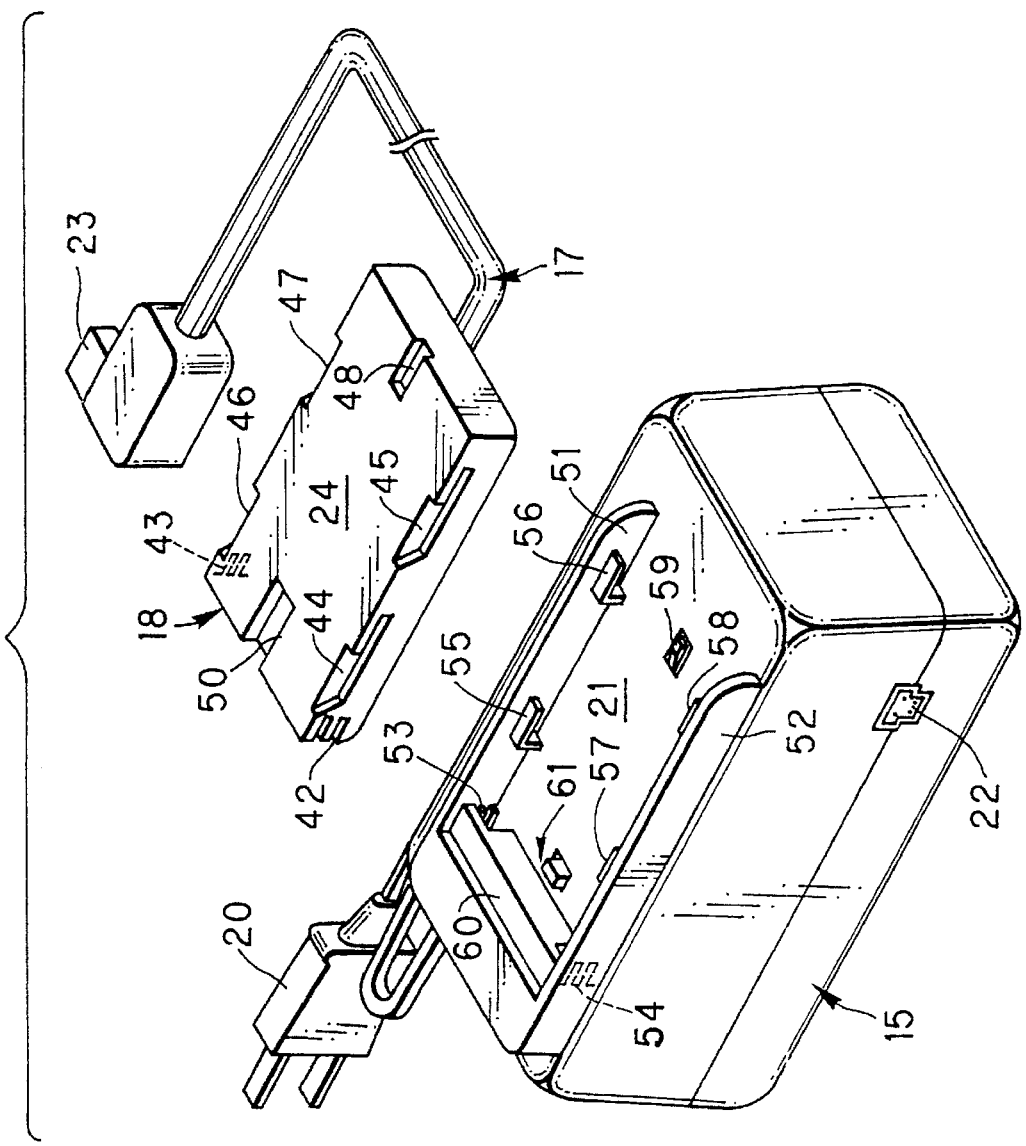
FIG. 4 is a perspective view illustrating an outer wall of the power source adapter and a receiving wall of the charger.

The receiving wall 21 of the AC charger 15, as illustrated in FIG. 4, has a size equal to the receiving wall 19 of the video camera 14. For the loading on to the outer wall 16 of the battery pack 11, the receiving wall 21 includes a pair of regulating rails 51 and 52, terminals 53 and 54, projections 55–58, an auxiliary hook 59, and a terminal cover 60, all of which are similar to counterparts of the receiving wall 19 of the video camera 14. The receiving wall 21 also has a lock 61 for regulating movement of the terminal cover 60 by detection of the pressing portion of a power source unit, for the purpose of loading of the coupler 18.

Figure 5:
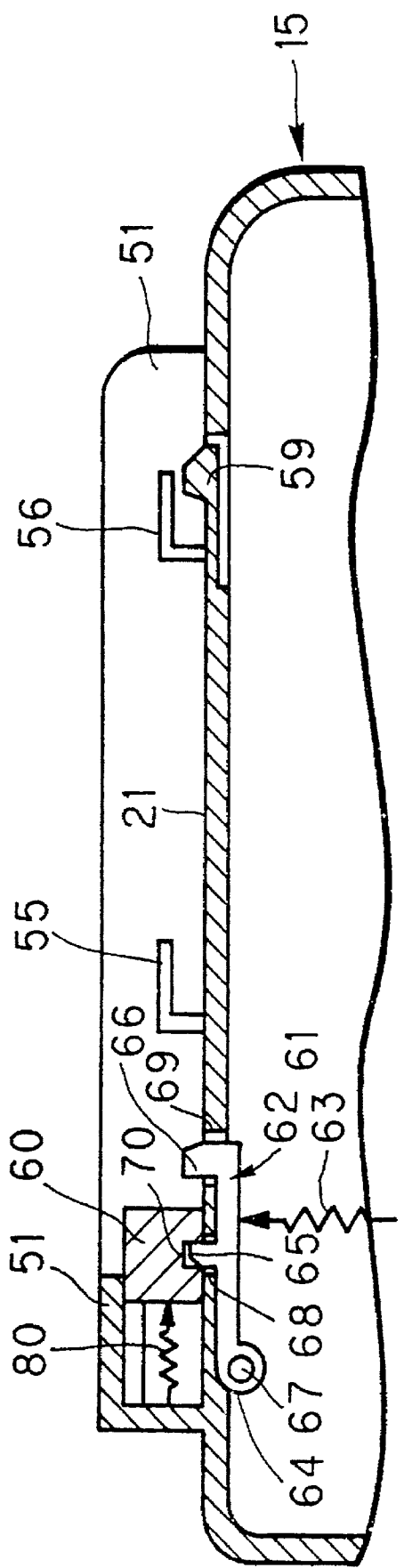
FIG. 5 is a vertical section illustrating the receiving wall of the charger.

The lock 61 is constituted by a lever 62 and a spring 63, as illustrated in FIGS. 5 and 6. The lever 62 has a bearing hole 64, a lock claw 65 and a detecting claw 66 as projected portion, all of which are formed integrally therewith. A shaft 67 is inserted through the bearing hole 64 to support the lever 62 in swingable fashion. The lock claw 65 and the detecting claw 66 are swingable between a projected state to project to the outside of through holes 68 and 69 in the receiving wall 21, and a retracted state to retract inside the through holes 68 and 69. The detecting claw 66 has a smaller width than the width of the detectable recess 50. An inclined face is formed on the detecting claw 66 and directed to an initial position of the battery pack 11. The spring 63 biases the lever 62 in a direction to have the projected state. The spring 63 is a coil spring, but may be a leaf spring.

The lock claw 65 is engaged with a retaining hole 70 formed in the bottom of the terminal cover 60 when the lever 62 has the projected state, and adapted to locking the terminal cover 60 in the covering position. The top of the lock claw 65 is provided with an inclined face, for facilitation in insertion of the lock claw 65 into the retaining hole 70 during movement of the terminal cover 60 from the uncovering position to the covering position. The detecting claw 66, upon detection of the pressing portion, is pressed, and causes the lever 62 to rotate to have the retracted state. The terminal cover 60 is unlocked in the covering position, and is movable to the uncovering position, to allow movement of the terminals 25 and 26 to the terminals 53 and 54. If the detecting claw 66 detects the detectable recess 50 adapted to a not loadable status, the detecting claw 66 remains free without pressure. The lever 62 still has the projected state, to inhibit the terminal cover 60 from moving to the uncovering position.

Figure 7:
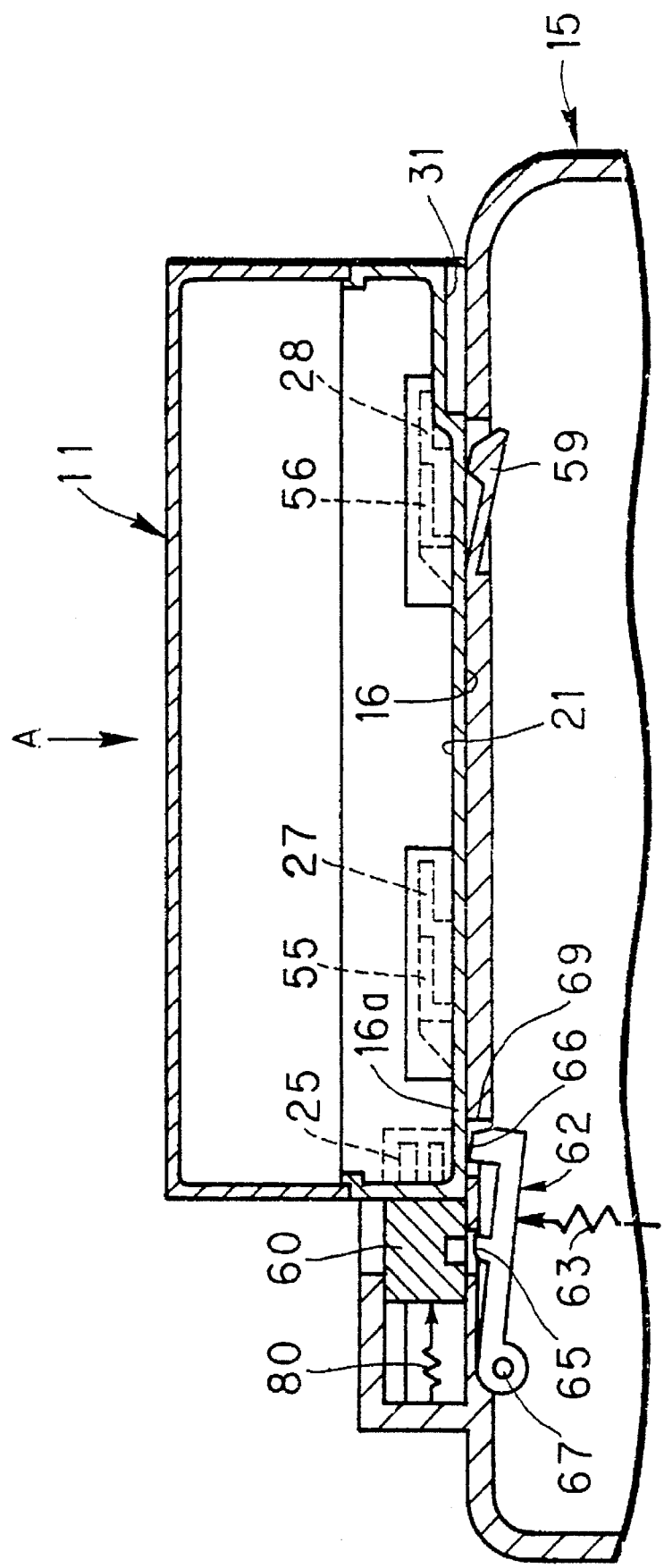
FIG. 7 is an explanatory view in section, illustrating a operation of contacting the battery pack on the charger.

Operation of the above construction is described now. For loading of the AC charger 15 with the battery pack 11, the outer wall 16 is contacted on the receiving wall 21 between the regulating rails 51 and 52, as indicated by the direction A in FIG. 7, in the position longitudinally away from the terminal cover 60. The auxiliary hook 59 is pressed by the outer wall 16 and deformed downward with resiliency. The detecting claw 66 is pressed by the pressing portion 16a to swing the lever 62 to have the retracted state. The lock claw 65 is moved away from the retaining hole 70, to unlock the terminal cover 60 in the covering position.

Figure 8:
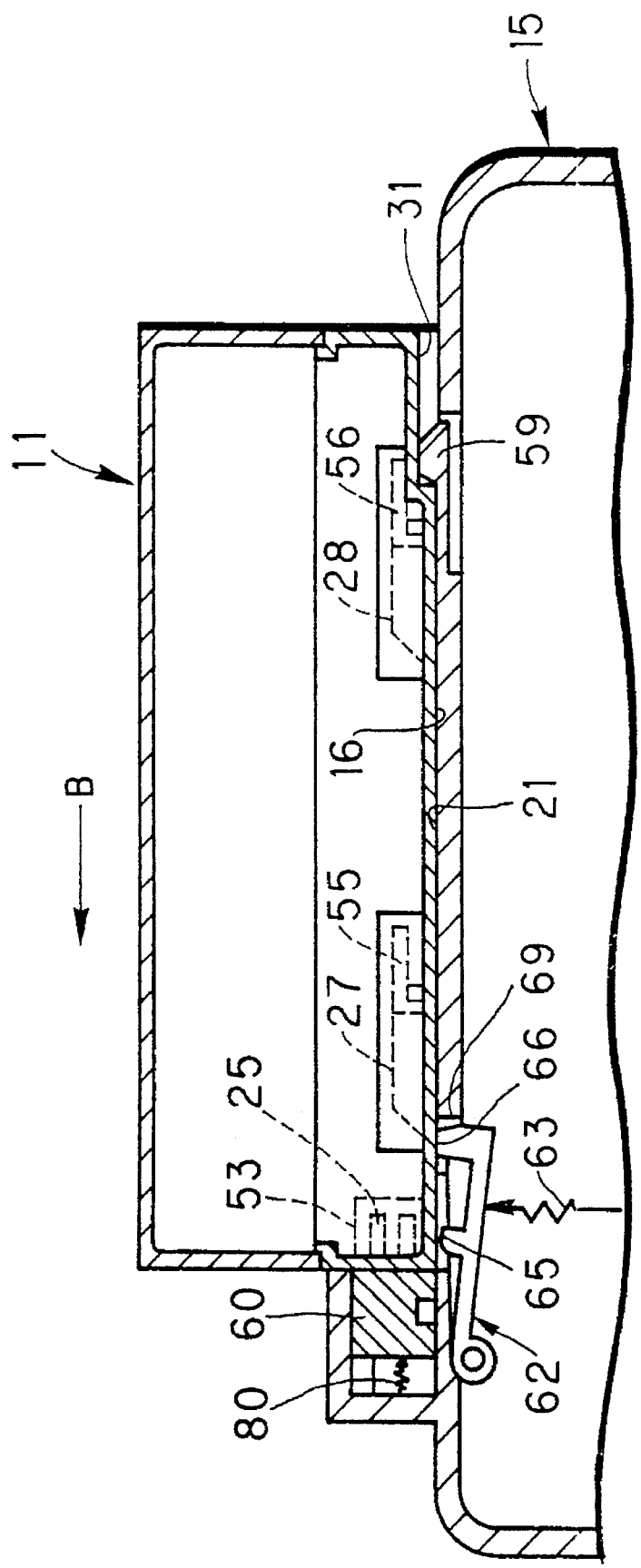
FIG. 8 is an explanatory view in section illustrating an operation of sliding the battery pack on the charger.

Then the battery pack 11 is slid in the direction B indicated in FIG. 8. The amount of the sliding is limited by a range in which the ridges 55–58 are received in the grooves 27–30. When the battery pack 11 is slid at this limited amount, an advancing face of the battery pack 11 presses the terminal cover 60 against a bias of a spring 80, until the terminal cover 60 comes to the uncovering position. During the slide, the terminals 53 and 54 emerging from the terminal cover 60 move into grooves in the battery pack 11, and become connected respectively to the terminals 25 and 26. After the movement, the auxiliary hook 59 comes into the cutout 31. The battery pack 11 is kept from moving in reverse to the slidable direction.

For removal of the battery pack 11, the battery pack 11 is slid in reverse to the direction B in FIG. 8. The rear end of the cutout 31 depresses the auxiliary hook 59, which is deformed downward again, so that the battery pack 11 can be removed easily. After the removal, the terminal cover 60 is moved to the covering position by the bias of the spring 80. As soon as the terminal cover 60 comes to have the covering position, the lock claw 65 associated with the spring 63 is allowed to enter the retaining hole 70. The lever 62 moves to have the projected state. The lever 62 is locking the terminal cover 60 in the covering position. The terminal cover 60 is not moved even by a wrong operation for pushing the terminal cover 60. The terminals 39 and 40 are reliably protected from deformation, corrosion or other damage. It is also possible to avoid short-circuiting the terminals 39 and 40 or touching them for bodily electrical shock even while the power source plug 20 is plugged to an outlet.

Figure 9:
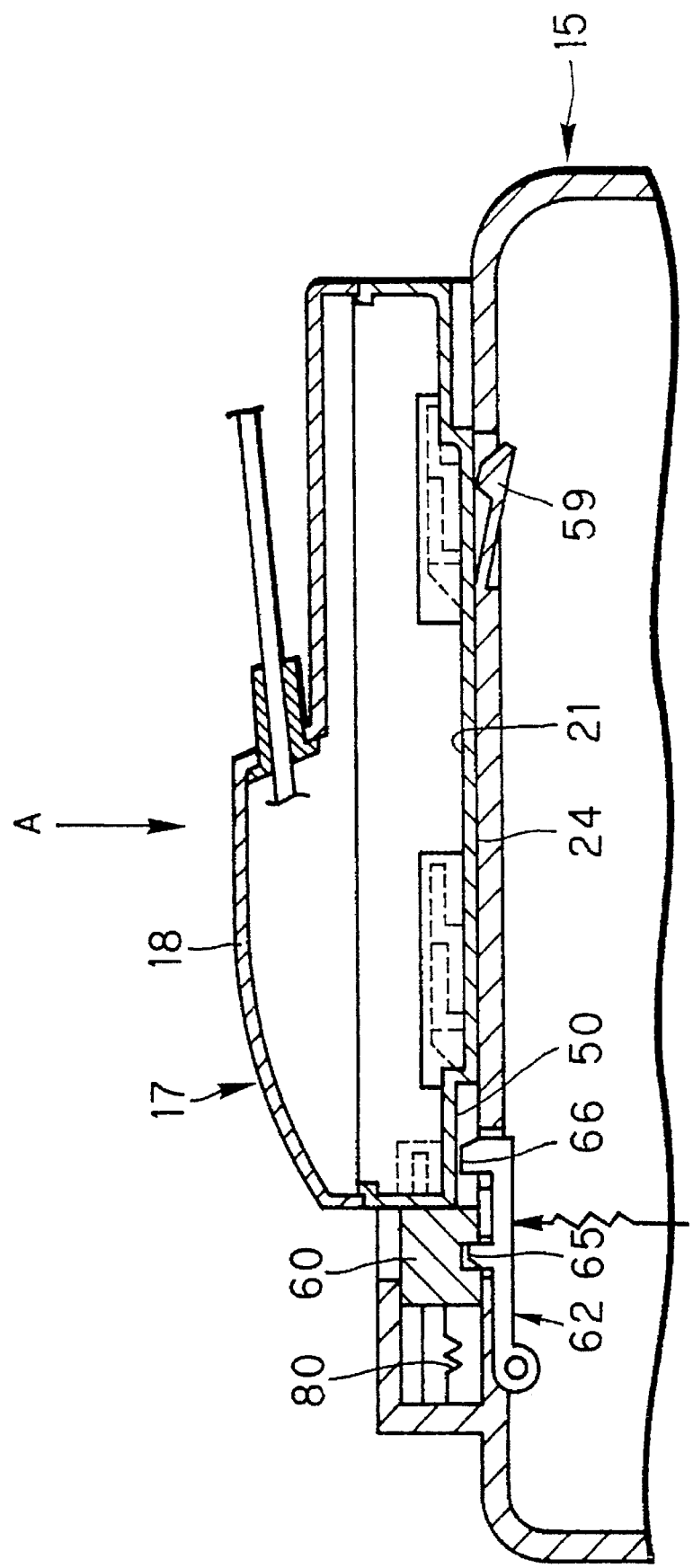
FIG. 9 is an explanatory view in section, illustrating a wrong operation of contacting the power source adapter on the charger.

There is an accidental occasion in which the coupler 18 is fitted on the AC charger 15, in the order similar to that of the battery pack 11. In FIG. 9, the outer wall 24 is contacted on the receiving wall 21 between the regulating rails 51 and 52 in a position away from the terminal cover 60. The auxiliary hook 59 is resiliently deformed in a downward direction while pressed by the outer wall 24. The detecting claw 66 comes into the detectable recess 50. The detecting claw 66 remains free, to cause the lever 62 to remain in the projected state. The terminal cover 60 is being locked in the covering position. The terminal cover 60 is kept immovable even if the coupler 18 is pressed against it for sliding movement. A user manually operating the coupler 18 is caused to feel considerable resistance by the terminal cover 60 as locked, to find the erroneous operation for the loading.

In the above embodiment, the battery pack 11 as storage battery device has the pressing portion 16a. It is possible to make effective use of a space inside the battery pack 11 to be designed. The battery pack 11 can be rendered compact. In the above embodiment, the pressing portion 16a is flat. However a projected pressing portion may be used instead. In consistency with this, an alternate receiving wall may have a peripheral recess around a hole for a detecting claw, which may be projected inside the peripheral recess.

It is to be noted that there is another battery pack of a type in which at least one dry battery is inserted. The present invention is applicable to such a type of battery pack, as it must be inhibited from being loaded on to the AC charger 15. This battery pack can have the detectable recess 50.

In the above embodiment, the single lock and the single pressing portion associated with the lock. Further it is preferable in the present invention to provide two or more locks and two or more pressing portions respectively associated with the locks. This enables the electronic instrument to effect selective loading of plural kinds of power source units. In the above, the lever 62 is a piece separate from the receiving wall 21. Alternatively a lever may be formed integrally with a receiving wall, with resiliency by cutting a slit in the receiving wall. It is possible with this lever to eliminate the spring 63 as additional bias device.

In the above embodiment, the lever 62 is formed integrally with the detecting claw 66 and the lock claw 65. It is possible in the present invention that a detecting claw has a structure independent from a lock claw. However this is a more complicated structure than the above, because the movement of the detecting claw must be detected to link it to the movement of the lock claw between the projected and retracted states, by means of a mechanical or electric additional construction. The above embodiment with the simpler structure of the lever 62, therefore, has the greater advantage.

The video camera 14, unlike the AC charger 15, has the terminal cover 41 without a lock, because the video camera 14 is loadable with any power source. However there is a different type of video camera, which may be damaged if loaded with a battery pack of a type containing a dry battery. The present invention is applicable to providing such a video camera with a lock associated with the terminal cover 41, for the purpose of inhibiting the loading of the unsuitable battery pack containing a dry battery.

Figure 10C:
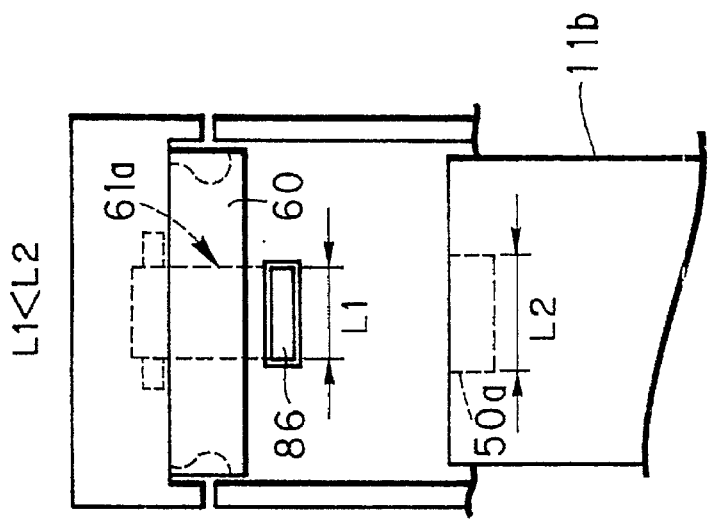
FIGS. 10A–10C are explanatory views illustrating another preferred embodiment in which a detecting claw and a detectable recess are modified in plural sizes.
Figure 10B:
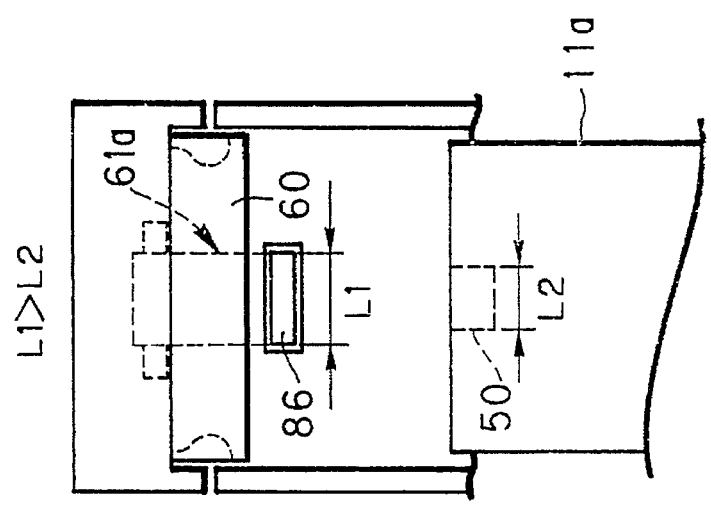
Figure 10A:
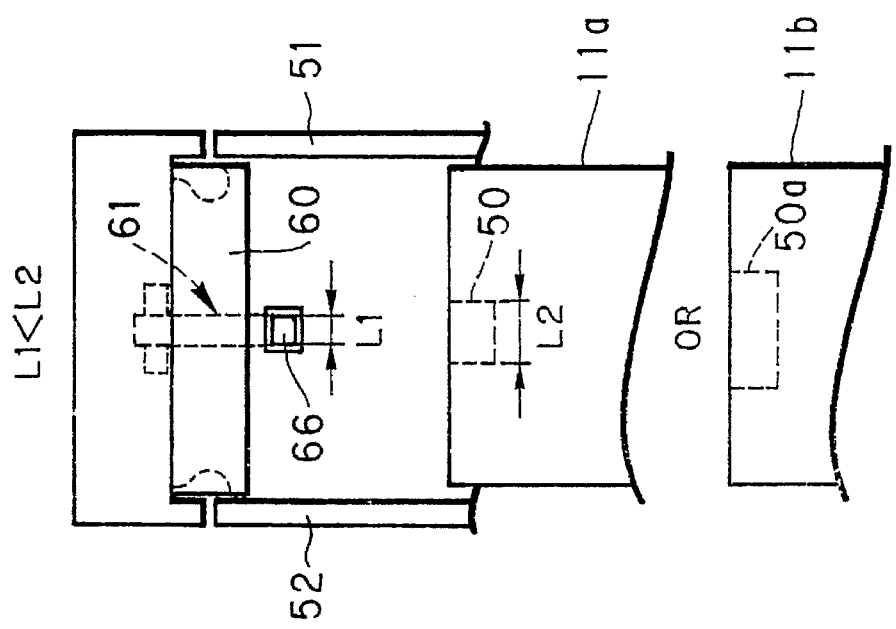

The present invention is also applicable to use of plural kinds of battery packs having different voltages. Should a battery pack with an unsuitable (higher) voltage be loaded on to a video camera or a charger, either of the combined circuits would be damaged. For three of more kinds of battery packs having different values of voltage, the structure distinctive from the pressing portion 16a can comprise plural kinds of detectable recesses. As illustrated in FIGS. 10A–10C, the detecting claw 66 has the size L1 changed with plural electronic instruments. The detectable recess 50 has the size L2 of openness changed with plural battery packs. In FIGS. 10A and 10B, a battery pack 11a has the detectable recess 50. In FIGS. 10A and 10C, another battery pack 11b has a detectable recess 50a larger than the detectable recess 50. In FIGS. 10B and 10C, a detecting claw 86 of another lock 61a has a size greater than the detecting claw 66. If L1<L2 as illustrated in FIGS. 10A and 10C, then the detecting claw 66, 86 is kept from being pushed due to the detectable recess 50, 50a. The terminal cover 60 is locked in the covering position, to avoid loading the battery pack 11a, 11b. If L1>L2 as illustrated in FIG. 10B, then the detecting claw 86 is pushed by the periphery of the detectable recess 50. The terminal cover 60 is unlocked from the covering position, to allow loading the battery pack 11a. If L2=0 with the battery pack 11 having the pressing portion 16a without any detectable recess (FIG. 2), naturally the detecting claw 66, 86 is pushed, to allow loading the battery pack 11.

It is possible that a battery pack, a coupler and the like have respective detectable recesses different in positions in the battery width direction relative to the position of the detecting claw 66 between the regulating rails, so as to enable/disable the loading in accordance with the kinds of the power source units. Modification of the detectable recess 50 in the position and the size relative to the detecting claw 66 makes it possible to effect selective loading of plural kinds of power source units.

Figure 11:
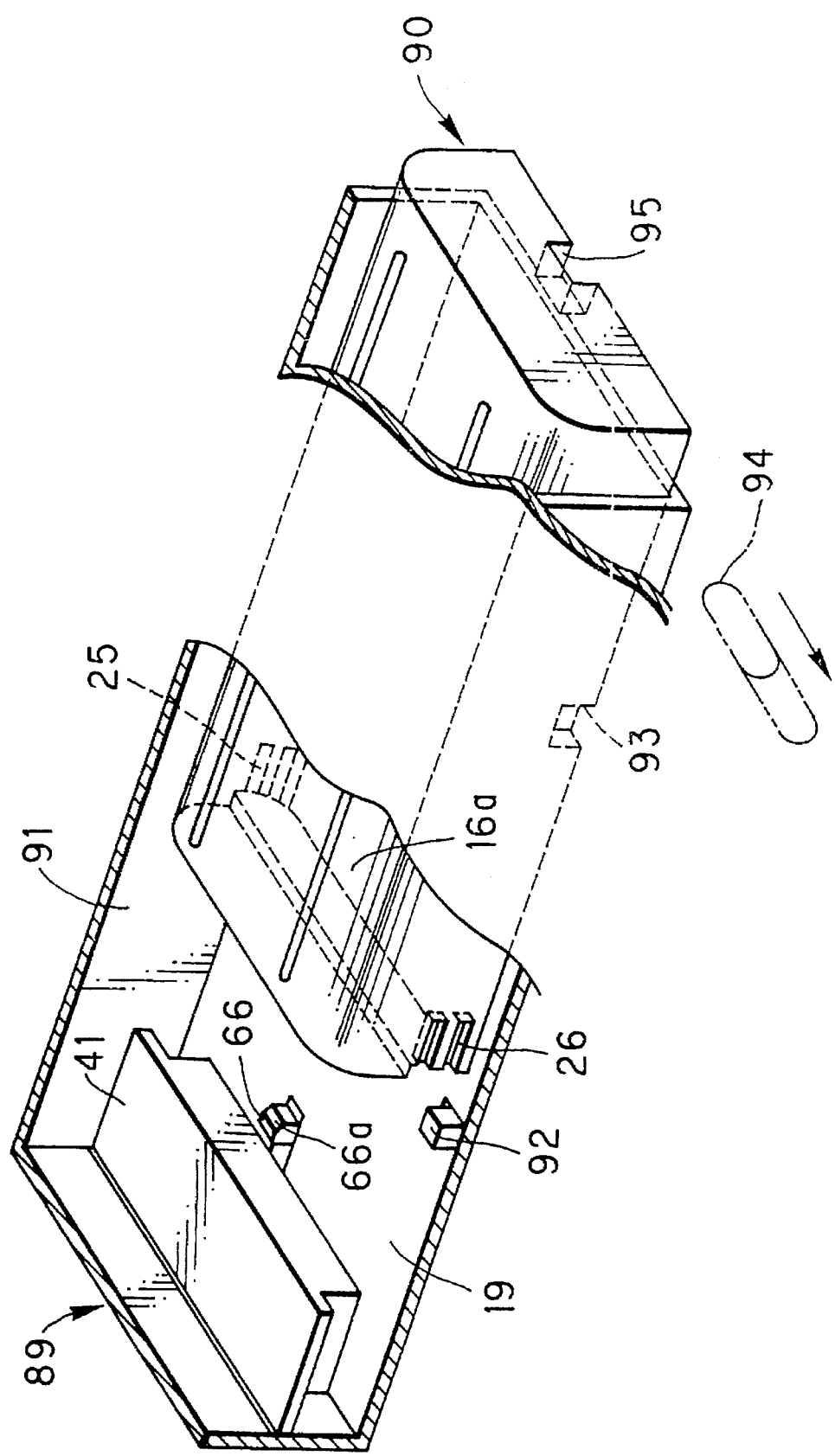
FIG. 11 is an explanatory view illustrating another preferred embodiment in which a battery pack is inserted into a video camera.

In the above embodiment, the battery pack 11 is mounted on the outside of the video camera 14. The present invention is also applicable to a combination of a battery pack 90 and a video camera 89 into which the battery pack 90 is inserted to be loaded, as illustrated in FIG. 11. The video camera 89 is provided with a loading chamber 91 having a shape to cover the contour of the battery pack 90. The battery pack 90 is inserted into the loading chamber 91 in the longitudinal direction. The pressing portion 16a of the battery pack 90 is gradually contacted on an inclined face 66a of the detecting claw 66, and depresses the detecting claw 66, to move the lever 62 to have the retracted state. The insertion of the battery pack 90 causes the terminal cover 41 to move to the uncovering position. The terminals of the battery pack 90 are connected to the terminals of the video camera 89.

In the video camera 89 for use with the battery pack 90, it is desired to dispose stopping projection 92 for keeping the battery pack 90 from dropping out of the loading chamber 91 despite the bias of the spring 63 via the terminal cover 41, or dispose a lid for closing an opening at which the loading chamber 91 opens externally. The stopping projection 92 is engaged with a cutout 93 formed in the battery pack 90, to hold the battery pack 90 in the loading state. When a removing button 94 outside the video camera 89 is operated, the stopping projection 92 is moved to its retracted state, to be disengaged from the cutout 93. Upon the disengagement, the bias of the spring 63 presses the battery pack 90 to the outside of the loading chamber 91. It is easy to remove the battery pack 90, as well as the mechanism for the battery removal is simplified. If the lid is disposed, it is preferred to hold the battery pack 90 in the connected state inside the loading chamber 91 by means of force keeping the lid in the closed orientation. Upon the operation to open the lid, the bias of the spring 63 causes the battery pack 90 to move outward quickly. It is also easy to remove the battery pack 90.

Should the battery pack 90 of the insertable type be inserted in the opposite direction, it might be difficult to recognize the misloaded condition. It is desirable for the battery pack 90 to have a detectable recess 95 in a position opposite to its advancing face. If the battery pack 90 is inserted in the opposite direction, then the detecting claw 66 in the loading chamber 91 is kept from being pushed as it is received in the detectable recess 95. The terminal cover 41 remains locked in the covering position, to avoid the reverse loading of the battery pack 90. The battery pack 90 cannot be inserted fully in the opposite direction, because of the terminal cover 41 as locked. This is favorable to inform a user of improper insertion.

In the above embodiments, the electronic instrument supplied with power is the video camera. The present invention is applicable to any other electronic instruments, inclusive of an electronic still camera, a portable telephone, a portable telefacsimile machine, a portable word processor, an electronic notebook, a portable liquid crystal television receiver, a portable audio cassette tape deck, a portable compact disk player, and an electronic toy.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A power supply system comprising an electronic instrument and a first power source unit electrically connected thereto, for supplying said electronic instrument with electric power, or for being supplied by said electronic instrument with electric power, said first power source unit comprising:

a first terminal group; and
a first outer wall being at least partially flat;
said electronic instrument comprising:
a second terminal group, connectable to said first terminal group;
a receiving wall fitted on said first outer wall when said first electronic instrument is attached to said first power source unit;
a projected portion, disposed in movable fashion between a projected state to project from an inside to an outside of said receiving wall, and a retracted state to retract to said inside of said receiving wall, said projected portion being pressed by said first outer wall and moved from said projected state to said retracted state, said projected portion being unmoved when said electronic instrument is attached to a unit not having said first outer wall;
a terminal cover, disposed on said receiving wall in movable fashion between a covering position of covering said second terminal group, and an uncovering position of uncovering said second terminal group, said terminal cover being pressed by said first power source unit and moved from said covering position to said uncovering position, said second terminal group being connected to said first terminal group, to allow loading of said first power source unit; and
a lock device, associated with said projected portion and said terminal cover, for hindering said terminal cover from moving away from said covering position while said projected portion has said projected state, said lock device allowing said terminal cover to move to said uncovering position when said projected portion has said retracted state.

2. A power supply system as defined in claim 1, wherein said first power source unit is slidable toward said terminal cover in contact with said receiving wall;

said second terminal group includes two terminals which are confronted with each other, and between which said terminal cover is disposed; and
said first terminal group includes two terminals respectively to contact said terminals of said second terminal group.

3. A power supply system as defined in claim 2, wherein said terminal cover is slidable in contact with said receiving wall; and said electronic instrument comprises a spring, secured to said terminal cover, for biasing said terminal cover toward said covering position, said first power source unit being slid on said receiving wall, to press said terminal cover to said uncovering position against a bias force of said spring.

4. A power supply system as defined in claim 3, wherein said electronic instrument further comprises a lever, disposed inside said receiving wall in swingable fashion between a nearer position nearer to said terminal cover and a farther position farther from said terminal cover;

wherein said projected portion comprises a first claw projected from said lever, said lever having said nearer position when said first claw has said projected state and having said farther position when said first claw has said retracted state; and
said lock device comprises a second claw projected from said lever and movable between said inside and said outside of said receiving wall, said second claw being moved to said outside of said receiving wall when said lever has said nearer position, for being engaged with said terminal cover, and said second claw being moved to said inside of said receiving wall when said lever has said farther position, for being disengaged with said terminal cover.

5. A power supply system as defined in claim 4, wherein said electronic instrument further comprises an inclined face formed on said first claw at a position remote from said terminal cover.

6. A power supply system as defined in claim 4, wherein said electronic instrument further comprises:

a first through hole, formed in said receiving wall, for allowing said first claw to pass therethrough;
a second through hole, formed in said receiving wall, for allowing said second claw to pass therethrough; and
a retaining hole, formed in said terminal cover, confronted with said lever, for retaining said second claw projected to said outside of said receiving wall.

7. A power supply system as defined in claim 6, wherein said electronic instrument further comprises first and second rails, disposed on said receiving wall, for supporting said terminal cover in slidable fashion between said covering and uncovering positions.

8. A power supply system as defined in claim 1, wherein said first power source unit further includes a detectable recess, formed in said first outer wall, disposed at a position remote from said first terminal group, having a size to contain said projected portion when said first outer wall is fitted on said receiving wall with said first terminal group directed away from said terminal cover, to leave said terminal cover in said covering position, thereby avoiding loading on said electronic instrument in wrong orientation.

9. A power supply system as defined in claim 1, wherein said first power source unit is a storage battery device, and said electronic instrument is a video camera supplied with said electric power by said storage battery device.

10. A power supply system as defined in claim 9, wherein said electronic instrument further comprises a loading chamber into which said first power source unit is inserted in movement in a longitudinal direction thereof, said receiving wall being formed inside said loading chamber.

11. A power supply system as defined in claim 1, wherein said first power source unit is a storage battery device, and said electronic instrument is a storage battery charger adapted to charging said storage battery device.

12. A power supply system as defined in claim 11, further comprising an alternative power source unit, said alternative power source unit comprising:

a third terminal group, formed similarly to said second terminal group, for supplying electric power externally;

a second outer wall, formed similarly to said first outer wall; and a detectable recess, formed in said second outer wall, having a size to contain said projected portion having said projected state, for receiving said projected portion when said second outer wall is fitted on said receiving wall, to leave said terminal cover in said covering position, said third terminal group being hindered from being connected to said first terminal group, thereby avoiding loading on to said electronic instrument.

13. A power supply system as defined in claim 12, said power supply system being used with an external electronic instrument, and said external electronic instrument including a fourth terminal group to which said first and third terminal groups are commonly connectable, and through which said external electronic instrument is supplied with said electric power.

14. A power supply system as defined in claim 13, wherein said alternative power source unit is an AC/DC converter for converting an alternative current of a commercial power source into a direct current.

15. A power supply system as defined in claim 14, wherein said external electronic instrument is a video camera.

16. A power supply system as defined in claim 1, wherein said receiving wall is disposed to emerge externally; and said electronic instrument further comprises:

first and second rails, which are disposed respectively along two opposite sides of said receiving wall, and erected from said receiving wall, and between which said first power source unit is mounted; and at least first and second ridges, disposed respectively on said first and second rails to project toward one another and to extend in a longitudinal direction of said first and second rails;

said first power source unit further comprises at least first and second grooves, formed respectively in fittable fashion on said at least first and second ridges while said first outer wall contacts said receiving wall, said first and second grooves guiding said first power source unit to move to said terminal cover in sliding on said first and second ridges, and being retained on said first and second rails via said first and second ridges.

17. A power supply system for an electronic instrument, including a storage battery device, a storage battery charger and an alternative power source unit, said electronic instrument having a first terminal group, said storage battery charger being adapted to charging said storage battery device, either of said storage battery device after charging and said alternative power source unit being connected to said first terminal group, for supplying said electronic instrument with electric power;

said storage battery device comprising:

a second terminal group, connectable to said first terminal group, for supplying electric power externally; and a first outer wall being at least partially flat and fittable on said electronic instrument;

said alternative power source unit comprising:

a third terminal group, connectable to said first terminal group, for supplying electric power externally;

a second outer wall being at least partially flat and fittable on said electronic instrument; and a detectable recess, formed in said second outer wall;

said storage battery charger comprising:

a fourth terminal group, connectable to said second terminal group, for supplying electric power externally;

a receiving wall fitted on said first outer wall;

a projected portion, disposed in a projected state to project from an inside to an outside of said receiving wall and in movable fashion between said projected state and a retracted state to retract to said inside of said receiving wall, said projected portion being pressed by said first outer wall and moved from said projected state to said retracted state, said projected portion in said projected state having a size equal to or smaller than a size of said detectable recess of said alternative power source unit, and being received in said detectable recess when said second outer wall is fitted on said receiving wall, to be left in said projected state;

a terminal cover, disposed on said receiving wall in a covering position of covering said fourth terminal group and in movable fashion between said covering position and an uncovering position of uncovering said fourth terminal group, said terminal cover being pressed by said storage battery device and moved from said covering position to said uncovering position, said fourth terminal group being connected to said second terminal group, to allow loading of said storage battery device; and a lock device, associated with said projected portion and said terminal cover, for hindering said terminal cover from moving away from said covering position while said projected portion has said projected state, to avoid wrong loading of said alternative power source unit, said lock device allowing said terminal cover to move to said uncovering position when said projected portion has said retracted state.

18. A power supply system as defined in claim 17, wherein said alternative power source unit is an AC/DC converter for converting an alternative current of a commercial power source into a direct current.

19. A power supply system as defined in claim 18, wherein said electronic instrument is a video camera.

20. In combination, at least first and second electronic instruments and at least first and second power source units which supply power to the electronic instruments, said first power source unit comprising:

a first terminal group for supplying electronic power externally; and a first outer wall being that is at least partially flat;

said second power source unit comprising:

a second terminal group, formed similarly to said first terminal group, for supplying electric power externally;

a second outer wall, formed similarly to said first outer wall; and a detectable recess formed in said second outer wall;

said first electronic instrument comprising:

a third terminal group, connectable to said first terminal group, and supplied with said electric power by said first power source unit;

a first receiving wall fitted on said first outer wall;

a first projected portion, disposed in a projected state to project from an inside to an outside of said first receiving wall and in movable fashion between said projected state and a retracted state to retract to said inside of said first receiving wall, said first projected portion being pressed by said first outer wall and moved from said projected state to said retracted state when said first power source unit is coupled to said first electronic instrument, said first projected portion in said projected state having a size equal to or smaller than a size of said detectable recess of said second power source unit, and being received in said detectable recess when said second outer wall is fitted on said first receiving wall, to be left in said projected state;

a first terminal cover, disposed on said first receiving wall in a covering position of covering said third terminal group and in movable fashion between said covering position and an uncovering position of uncovering said third terminal group, said first terminal cover being pressed by said first power source unit and moved from said covering position to said uncovering position, said third terminal group being connected to said first terminal group, to allow coupling of said first power source unit to said first electronic instrument; and a first lock device, associated with said first projected portion and said first terminal cover, for hindering said first terminal cover from moving away from said covering position while said first projected portion has said projected state, to avoid coupling of said second power source unit to said first electronic device, said first lock device allowing said first terminal cover to move to said uncovering position when said first projected portion has said retracted state;

said second electronic instrument comprising:

a fourth terminal group, connectable to said second terminal group, and supplied with said electric power by said second power source unit;

a second receiving wall fitted on said second outer wall;

a second projected portion, disposed in a projected state to project from an inside to an outside of said second receiving wall and in movable fashion between said projected state and a retracted state to retract to said inside of said second receiving wall, said second projected portion in said projected state having a size larger than said detectable recess in said second power source unit, said second projected portion being pressed by said second outer wall and moved from said projected state to said retracted state when said second power source unit is coupled to said second electronic instrument;

a second terminal cover, disposed on said second receiving wall in a covering position of covering said fourth terminal group and in movable fashion between said covering position and an uncovering position of uncovering said fourth terminal group, said second terminal cover being pressed by said second power source unit and moved from said covering position to said uncovering position, said fourth terminal group being connected to said second terminal group, to allow coupling of said second power source unit to said second electronic instrument; and a second lock device, associated with said second projected portion and said second terminal cover, for hindering said second terminal cover from moving away from said covering position while said second projected portion has said projected state, said second lock device allowing said second terminal cover to move to said uncovering position when said second projected portion has said retracted state.

21. The combination recited in claim 20 wherein said first and second power source units are different in voltage.

* * * * *